United States Patent [11] 3,538,936

[72] Inventors Douglas M. Longyear
Pasadena;
Donald R. Cooper, North Hollywood,
California
[21] Appl. No. 837,996
[22] Filed June 16, 1969
Continuation of Ser. No.
641,547, May 26, 1967, abandoned
[45] Patented Nov. 10, 1970
[73] Assignee The Bendix Corporation
a corporation of Delaware

[54] MECHANICALLY DEFLECTED FLUID STREAM SERVOVALVE
13 Claims, 8 Drawing Figs.
[52] U.S. Cl. .................................................. 137/83,
91/3
[51] Int. Cl. ...................................................... F15b 5/00,
G05d 16/00
[50] Field of Search .......................................... 137/83, 85,
625.64; 91/3

[56] References Cited
UNITED STATES PATENTS
| | | | |
|---|---|---|---|
| 3,081,787 | 3/1963 | Meulendyk .................. | 137/85X |
| 3,223,103 | 12/1965 | Trinkler ....................... | 91/3X |
| 3,268,186 | 8/1966 | Bosworth ..................... | 91/3X |
| 3,272,077 | 9/1966 | Meulendyk .................. | 91/3 |
| 3,362,423 | 1/1968 | Swinehart .................... | 137/83 |

FOREIGN PATENTS
| | | | |
|---|---|---|---|
| 673,159 | 10/1929 | France ......................... | 137/83 |

*Primary Examiner*—Alan Cohan
*Attorneys*—Robert C. Smith and Plante, Arens, Hartz and O'Brien

ABSTRACT: A servovalve device for providing an output varying in proportion to an input condition including a stationary nozzle for directing a control flow toward a pair of receiver passages communicating with a controlled device. A deflector member is moved into the control stream by means responsive to the input condition, such as a torque motor or bellows device, in such manner as to produce a small deflecting stream which deflects the main control stream to vary the relative fluid pressures in the receiver passages.

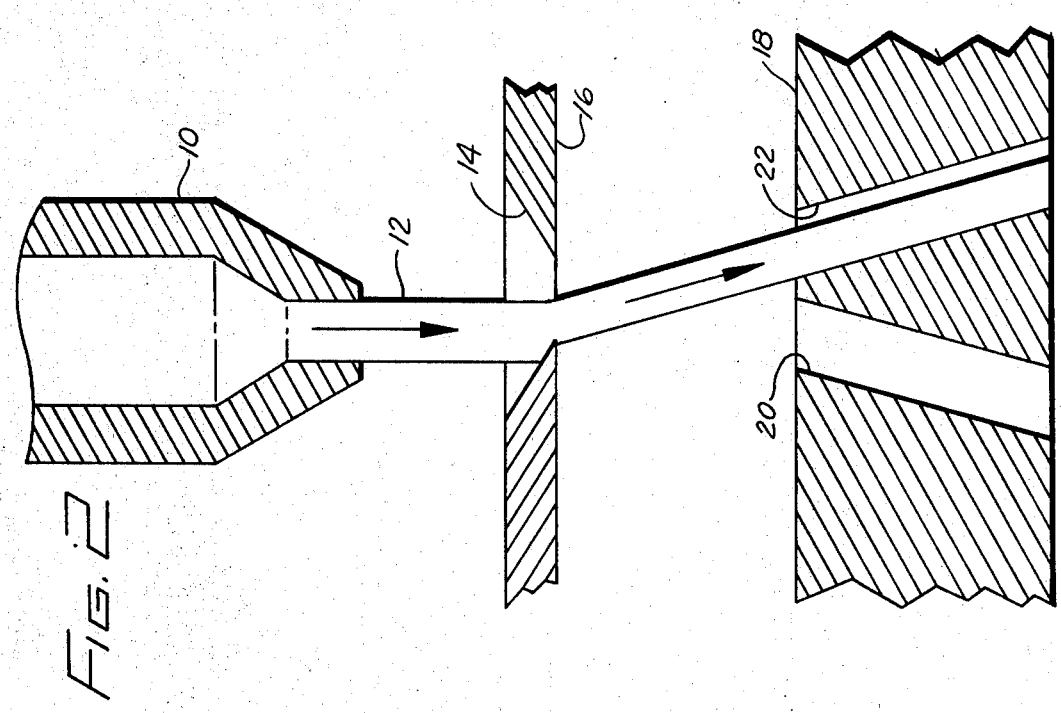
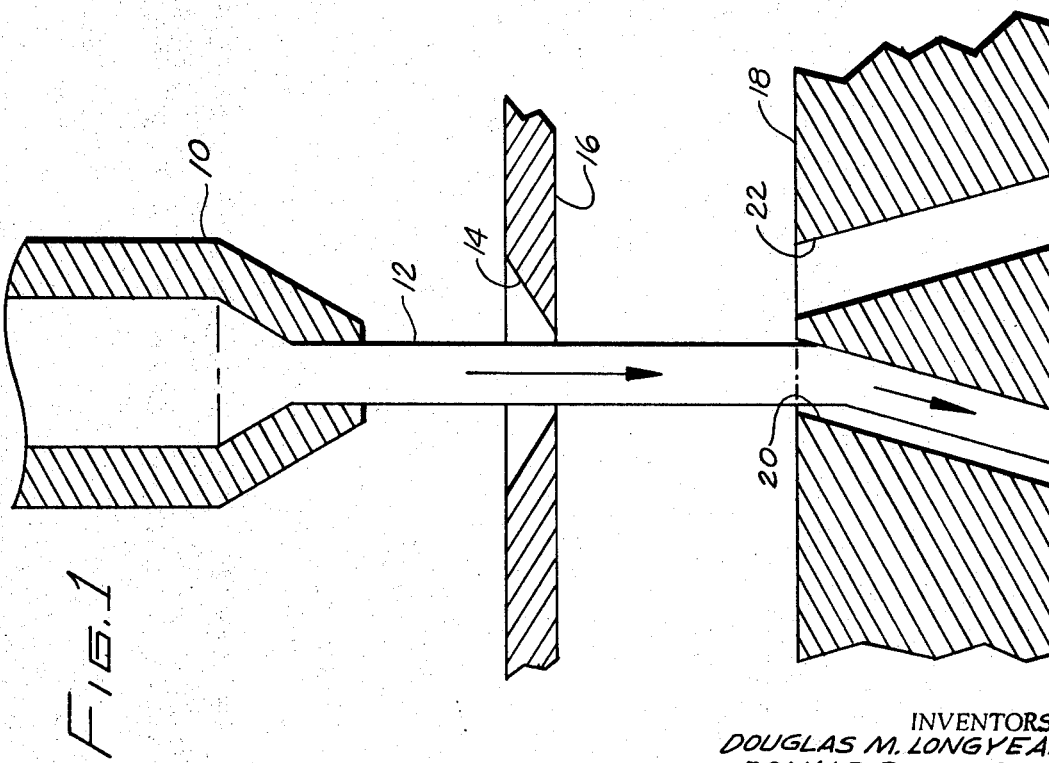

INVENTORS.
DOUGLAS M. LONGYEAR, JR.
DONALD R. COOPER
BY
*Robert C. Smith*
ATTORNEY Patented Nov. 10, 1970 3,538,936
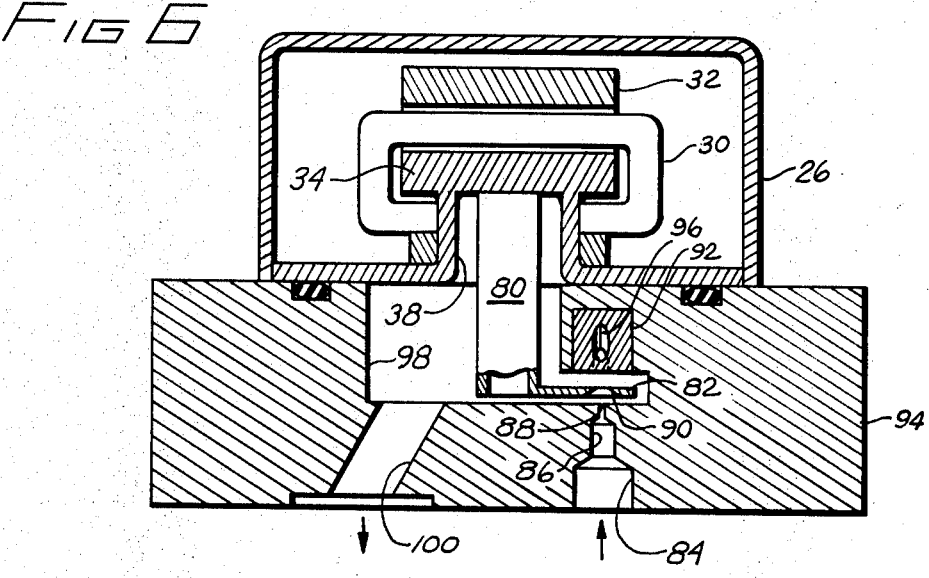
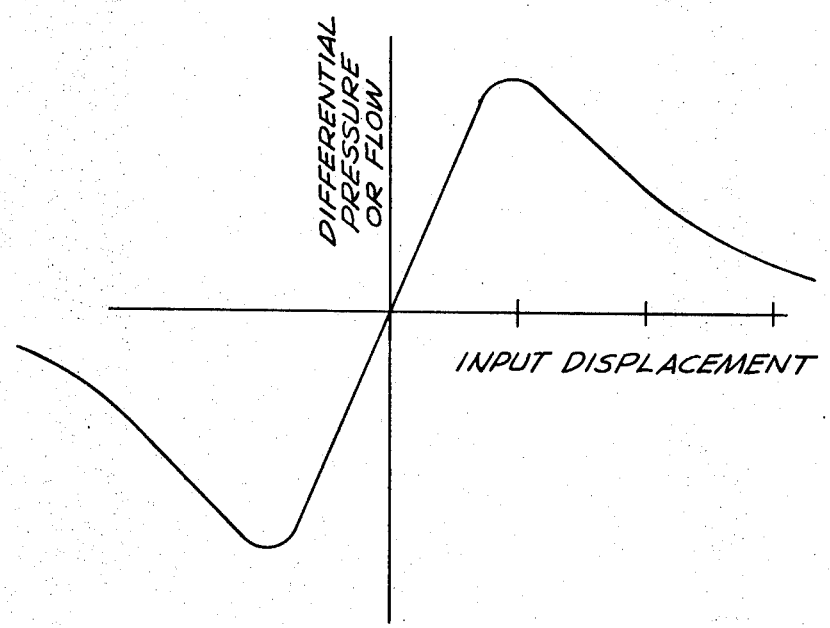
INVENTORS.
DOUGLAS M. LONGYEAR, JR.
DONALD R. COOPER
BY
ATTORNEY

MECHANICALLY DEFLECTED FLUID STREAM SERVOVALVE

This application is a continuation of Ser. No. 641,547, filed May 26, 1967 and now abandoned.

BACKGROUND OF THE INVENTION

This invention relates to fluid servovalves, and more particularly to a type of servovalve in which a control fluid stream is produced which may be directed toward a plurality of receiver ports and passages to control a pressure or pressure differential downstream. The invention herein utilizes mechanical means for deflecting the control fluid stream to vary the pressures in the receiver passages.

The most widely used type of servovalve is perhaps the electrohydraulic type in which a torque motor is used to convert an electrical input signal into a mechanical output. The armature of the torque motor is connected to a flapper valve which partially restricts the flow from a pair of nozzles. A hydraulic motor having a piston or second stage spool valve may be positioned upstream of the nozzles in such manner that moving of the flapper valve causes flow from one of the nozzles to be more restricted and the other to be less restricted, thus varying the pressure on opposite sides of the piston or spool valve to cause movement thereof. A disadvantage of this type of valve for some applications is that either an electrical malfunction or a blocked passage can cause an output which is the same as a "hard over" signal or maximum error signal in one direction. Where the servovalve controls a hydraulic motor for an aircraft control surface, this result would be very unsatisfactory. For such applications it is preferred to have a servovalve which, in case of a "hard over" or saturated input signal, would produce a pressure or hydraulic output similar to that from a zero input signal. There are types of fluid jet valves which have, to some degree, this type of characteristic. One such valve utilizes a pair of receiver ports connected to a second stage spool valve or other downstream actuator and incorporates a movable nozzle which varies the flow into the receiver ports in proportion to the direction in which its control stream is directed. A "hard over" or saturated input signal causes the movable nozzle to be moved to a position where only a limited flow is directed toward either of the receiver orifices, although a lower value input signal of the same polarity or sense would give a maximum output signal. This valve configuration has a disadvantage in that the fluid supply pressure, which may be quite high, must be retained through a flexural seal or connection.

Another type of valve which may avoid the saturated input problem is a fluidic type wherein a large control flow stream is diverted by means of a small signal flow which impinges on the control stream such as to divert the control stream toward one receiver port and away from another to produce a desired pressure differential. This arrangement has been particularly useful as a fluidic switching device, although it is operative as a proportional device as well. Since the orifices through which the input signal stream is directed may be only a few thousandths of an inch in diameter, they are susceptible to being plugged by solid contaminants. Also, means must be provided for converting a control signal, which may be electrical or pneumatic, into the desired proportional signal flow stream.

SUMMARY OF THE INVENTION

In applicants' servovalve device, a mechanical deflecting member is employed which is proportionally movable in response to an input condition. It deflects a control stream flowing from a stationary nozzle into receiving ports as desired so no flexural conduit or seal is required to contain supply pressure. No small control orifices are required for a lateral signal stream, and no conversion means is required to convert an electrical or pneumatic input signal to a fluid input signal. The arrangement inherently permits both proportional control (where output with respect to a given variable is proportional to a given input condition) and a very low level output when the electrical or other input signal exceeds a given value, so that a "hard over" or saturated input signal will not result in a maximum output signal. The control stream may carry substantial power, and the deflecting member is movable by electromagnetic or mechanical means requiring very low power input. Typically, the deflecting member may be moved by means of an electrical torque motor or, if the input signal may more conveniently be pneumatic or hydraulic, by an arrangement including resilient members such as bellows which may contain gas or liquid subject to control pressures.

DESCRIPTION OF THE DRAWINGS

FIG. 1 is a cross-sectional view showing the nozzle, receiver ports and deflector member of a servovalve incorporating my invention.

FIG. 2 is a view similar to FIG. 1 with the deflection member translated such as to deflect the control stream.

FIG. 6 is a cross-sectional view of another embodiment of my invention having a torque motor input.

FIG. 7 is a graph showing a typical transfer characteristic of a servovalve made according to my invention.

DESCRIPTION OF THE PREFERRED EMBODIMENTS

Figure 3:
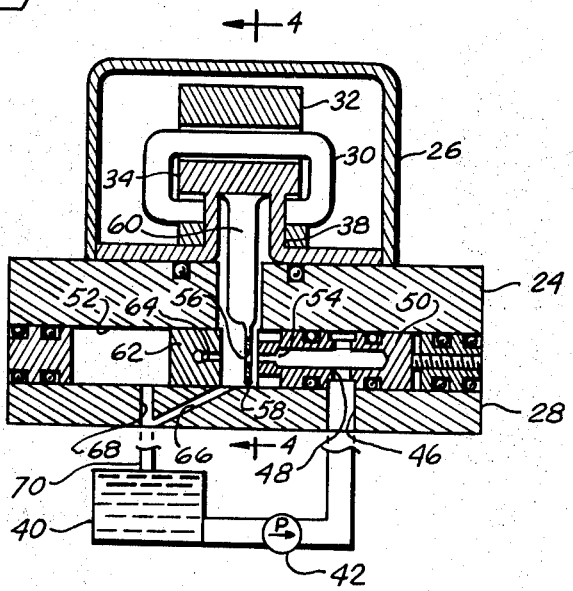
FIG. 3 is a cross-sectional view of a servovalve according to my invention wherein the input device is an electrical torque motor.

Referring now to FIG. 1, the stationary nozzle 10 is shown directing a stream of liquid 12 through a tapered port 14 in a deflection member 16 toward a receiver member 18 which contains a first receiver port 20 and a second receiver port 22. The fluid stream 12 passes directly through the port 14 in the deflector member 16 and impinges directly upon the receiver port 20 of receiver member 18. With this arrangement, it will be recognized that essentially all of the energy contained in the stream 12 will be transferred through the deflector and into port 20 and through this port to control means downstream. The same members appear in FIG. 2, and these have been numbered in identical fashion to FIG. 1, but the reader will observe that the deflection member 16 has been displaced to the right such that the left side of the tapered port 14 impinges upon the stream 12. It has been found that a relatively small impingement of this nature will create within the stream 12 a deflecting stream which is effective to deflect the entire control stream 12. In this case, the stream 12 is diverted from the port 20 to the port 22 such that essentially all of the energy contained in the stream 12 now is recovered in port 22. While the arrangement of FIGS. 1 and 2 shows what is essentially a switching means for switching the flow from one receiver port to another, it will be appreciated that it is also possible to direct the control stream 12 in such manner as to split the pressure recovery from the control stream 12 between the two receiver ports, either under no input signal conditions or under a given input signal condition. This arrangement will be described in connection with the embodiments discussed below.

Figure 4:
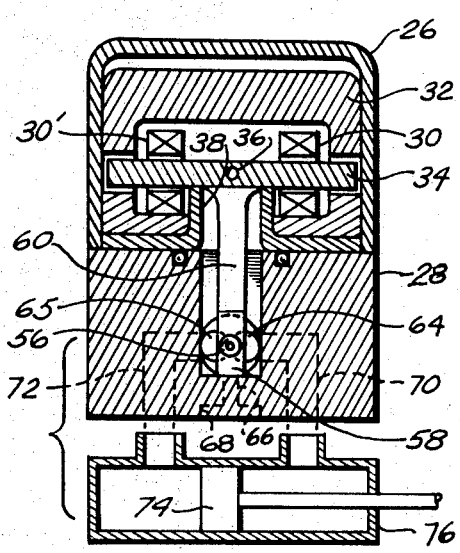
FIG. 4 is a sectional view taken along line 4-4 of FIG. 3.

FIG. 3 shows a cross-sectional view of a torque motor controlled servovalve incorporating my invention. This valve is shown generally at numeral 24 and includes a torque motor section 26 and a control valve section 28. The torque motor section includes an electrical winding 30 in association with a frame structure 32 of ferrous metal for directing the magnetic flux and an armature member 34 which is movable in proportion to the signal energizing winding 30. The same members appear in FIG. 4, which is a cross-sectional view of the device of FIG. 3 taken along the lines 4-4. In FIG. 4 also appears a second winding 30' which operates in conjunction with winding 30 to control the movement of the armature 34 which pivots around a pivot point 36. A thin torque tube seal is brazed to the lower side of armature 36 and is also in sealing engagement with the surface of the valve structure 28. It is the purpose of this seal to prevent the high fluid pressures acting on the interior of control valve structure 28 from reaching the windings 30 and 30'. The working fluid from a reservoir 40 is supplied under substantial pressure by means of a pump 42 through a conduit 44 to an inlet port 46 from whence it is placed in communication with a bore 48. This bore communicates with the hollow interior of a cylindrical member 50 positioned within an elongated bore 52 in member 28. At a right hand end of cylindrical member 48 is a small diameter passageway 54 which effectively constitutes a nozzle in direct alignment with a port 56 positioned in an extension 58 of a flapper valve member 60 attached to the armature 34. The extension 58 is drawn partially in section to show the port 56 more clearly. Also positioned in bore 52 is a receiver member 62 which includes a pair of receiver ports, one of which is shown at numeral 64. Control fluid not entering one of the receiver ports is communicated by means of a diagonal passageway 66 communicating with an outlet chamber 68 which, in turn, is in communication through a return conduit 70 with the reservoir 40.

Figure 5:
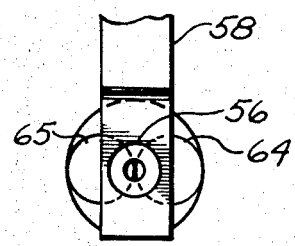
FIG. 5 is an enlarged view of a portion of FIG. 4 showing the relationship between the receiver ports and the port in the deflection member.

The relationship between the flapper extension 58, including its orifice 56, and the receiver 62 is shown more clearly in FIGS. 4 and 5. Orifice 56, which is in alignment with the nozzle 54 forming part of cylindrical member 48, is shown in front of the receiver orifices 64 and 65. This is shown somewhat more clearly in FIG. 5, which is an enlargement of the portion of FIG. 4 showing only the flapper extension 58 with its orifice 56 and the receiver ports 64 and 65, shown in plan view. A pair of passageways 70 and 72 provide communication between the receiver ports 64 and 65, respectively, and opposite sides of an actuating piston 74 in a hydraulic motor 76.

In considering the operation of the device shown in FIGS. 3, 4 and 5, it will first be assumed that there is no input signal to the torque motor 26 and that the flapper member 60 is therefore held in its center position as illustrated in FIGS. 4 and 5. Fluid under pressure from pump 42 is ejected from the nozzle 54 with considerable force through the orifice 56 and impinges substantially equally against the receiver ports 64 and 65, with a certain amount flowing through the return conduit 66. With equal flows into receiver ports 64 and 65, the pressure level sensed through conduits 70 and 72, respectively, on the opposite sides of piston 74 will be essentially equal, and there will be no force tending to cause piston 74 to be moved from its position. When an electrical signal of one polarity is applied to the windings 30 it will cause a rotation of the armature 34 sufficient to move the flapper extension 58 to the right as viewed in FIGS. 4 and 5. By means of a very low energy signal, the flapper valve member 60 can be moved sufficiently to cause the edge of orifice 56 to deflect the control flow from nozzle 54 substantially or entirely into the receiver port 64 such that the pressure downstream from this port will become much greater than the pressure downstream from port 65. Thus the pressure on the left side of piston 74 will become substantially less than the pressure on the right side, and piston 74 will be caused to move toward the left. Similarly, an electrical signal of opposite polarity will cause the flapper member to move such that orifice 56 is placed somewhat more nearly in alignment with receiver port 65 such that a greater part of the control flow will impinge upon orifice 65 and a lesser part, or none, of the flow to impinge upon orifice 64. This will cause the pressure acting on the left side of piston 74 to exceed that acting on the right side, and the piston will move toward the right. FIG. 7 shows the transfer characteristic of a device such as that shown in FIGS. 3, 4 and 5. On the horizontal axis is plotted the displacement of the flapper valve extension or the orifice 56, the edges of which effect the deflection of the control stream. On the vertical axis appears the pressure differential or flow differential resulting from the input displacement. The operation thus far described with respect to FIG. 7 covers only that occurring between the origin and the peak of the curve in either direction. Should a malfunction occur, such as a short circuit, which would cause the flapper member 60 to be moved toward an extreme position in either direction, this will result in a rapid reduction in the output flow because the deflecting surface will have moved past the position where it deflects the maximum amount of control flow into either of orifices 64 or 65 and less and less of the control flow reaches either orifice. The result is that a "hard over" or saturation signal into the torque motor will result in deflecting the control flow almost entirely away from the receiver ports. This produces a result, so far as the hydraulic motor is concerned, which is essentially the same as that produced from no input signal.

A different embodiment of torque motor controlled servovalve is shown in FIG. 6, wherein the torque motor structure is essentially the same as that shown in FIGS. 3, 4 and 5 and is given number 26 accordingly. A number of other elements which are the same or essentially the same as those appearing in FIGS. 3, 4 and 5 have been given identical numerals. The torque motor 26 is identical to that shown in FIGS. 3, 4 and 5 with one important exception, which is that the flapper valve 80 has an extension 82 formed at right angles to the main flapper shaft rather than axially aligned therewith. Hydraulic fluid under pressure is supplied to an inlet conduit 84 having a reduced diameter portion 86 which communicates with a nozzle 88 in alignment with the tapered port 90 in the flapper member extension 82. A receiver block 92 is firmly positioned within the valve structure 94, to which the torque motor 26 is attached. Visible in this view is one of the two receiver passages 96. In this instance it will be appreciated that the receiver passages communicate with opposite sides of a second stage valve member or a hydraulic motor, as shown in FIG. 4. The working fluid which does not flow into one of the receiver ports of the receiver block will be at a reduced, but still significant pressure, and the torque tube seal 38 is required to assure that this fluid does not reach the windings 30. The return side of the fluid pressure source is connected to the chamber 98 through a conduit 100. Operation is essentially the same as described with respect to the device shown in FIG. 3 with the exception that the deflecting member moves in a horizontal plane rather than a vertical plane. In either case, the extension attached to the flapper member must be attached rigidly so that the position of the orifice 56 or 90 will be consistently and repeatably proportional to the input signal to the torque motor.

Figure 8:
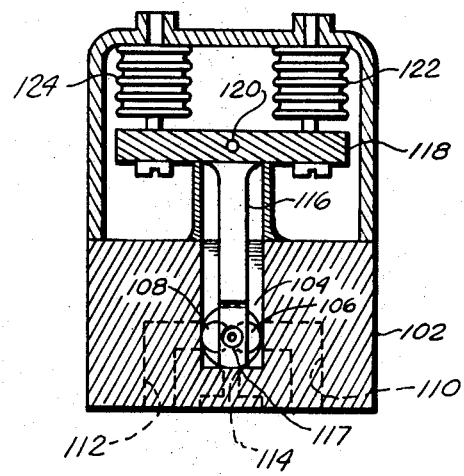
FIG. 8 is a cross-sectional view of another embodiment of my invention in which a fluid pressure responsive bellows arrangement is used to control the deflection member.

Another embodiment of my servovalve device appears in FIG. 8. In this device, the valve block 102 may be the same as that shown at numeral 28 in FIGS. 3 and 4, and the view shown is an identical section through the valve block. A receiver member 104 contains a pair of receiver ports 106 and 108. These receiver ports transmit fluid through conduits 110 and 112, respectively, to a second stage spool or a hydraulic motor such as that shown in FIG. 4. Working fluid not received in one of the receiver ports is returned to the source through a return conduit 114. In this embodiment the flapper member 116 is moved by means of a lever member 118 pivoted at point 120. A pair of sylphon bellows attached to opposite sides of lever 118 receive pneumatic signals responsive to a desired pressure input. Those skilled in the art will recognize that bellows members 122 and 124 may be arranged to sense a desired pressure differential, either hydraulic or pneumatic, or one of the bellows may be filled with a temperature compensating fluid with or without an additional internal spring to provide a desired reference signal against which the sensed pressure signal would operate. In operation, the desired pressure signal would appear as an unbalance of forces on opposite sides of pivot member 120, causing lever 118 to rotate slightly. This, in turn, moves flapper member 116, thereby displacing the deflecting orifice 117 relative to the receiver ports 106 and 108.

Although only a limited number of embodiments have been shown and described herein, modifications may be made to suit the requirements of specific applications without departing from the scope of the present invention.

We claim:

1. A valve connected to a source of fluid under pressure comprising:
   a pair of stationary receptor ports in close proximity to each other and each terminating a bore with an outer end adapted to receive fluid, said bores being angularly disposed at an acute angle to each other;
   a fluid connection from each of said bores;
   a conduit connected to said source;
   a nozzle terminating said conduit and positioned to normally direct a control stream to at least one of said bores;
   a movable deflector member normally positioned adjacent said control stream between said nozzle and said ports, said member having a tapered contacting surface formed to intersect said stream at an angle, said surface intersecting the surface of said member nearest said receptor ports at an acute angle and forming an edge therewith; and
   means moving said deflector member such that said tapered contacting edge intrudes into said stream just sufficiently that a small deflecting stream is produced which deflects substantially the entire flow of said control stream at an angle with respect to its direction leaving said nozzle into one of said bores normally receiving no more than a portion of said control stream.

2. A valve as set forth in claim 1 wherein said means moving said deflector member includes a torque motor.

3. A valve as set forth in claim 2 wherein said torque motor includes:
   electrical winding means;
   an armature movable relative to said winding means upon energizing of said winding means; and
   said deflector member is fastened to said armature and movable therewith.

4. A valve as set forth in claim 2 wherein said torque motor includes:
   electrical winding means;
   an armature movable relative to said winding means when said winding means is energized;
   a flapper member fastened to said armature and movable therewith; and
   said deflector member is fastened to the end of said flapper member essentially perpendicular to the axis of said flapper member.

5. A valve as set forth in claim 1 wherein said means moving said deflector member includes a pivotable member, and fluid pressure responsive means are attached to said pivotable member.

6. A valve as set forth in claim 5 wherein said fluid pressure responsive means includes at least one bellows and yieldable metal seal means are provided for isolating said bellows from said source.

7. A valve connected to a source of fluid under pressure comprising:
   first and second outlet ports;
   first and second receptor passages terminating in receiver ports in close proximity to each other, said passages being angularly disposed to each other and each of said passages being connected with one of said outlet ports;
   an inlet conduit connected to said source;
   a nozzle terminating said inlet conduit and positioned such that its axis bisects the angle between said passages, thus directing a control stream from said nozzle equally to each of said receiver ports;
   a movable deflector member normally positioned adjacent said control stream between said nozzle and said ports, said member having a deflecting orifice having a configuration essentially corresponding to the cross-sectional shape of said control stream with said orifice including a tapered contacting surface formed to intersect said stream at an angle and meeting the surface of said member nearest said receptor ports at an acute angle and forming an edge therewith; and
   means responsive to an input condition for moving said deflector member such that said edge intrudes into said flow just sufficiently that a small deflecting stream is produced which deflects substantially the entire control stream into one of said receiver ports.

8. A valve as set forth in claim 7 wherein said nozzle normally directs said control stream between said first and second passageways so that substantially equal portions of said control stream flow into each of said passageways, and movement of said deflector member into said control stream causes a greater proportion of said control stream to flow into one of said passages and less into the other of said passages.

9. A valve as set forth in claim 8 wherein said deflector member is movable in proportion to an input condition and the pressure differential in said outlet passages is substantially proportional to said input condition.

10. A valve as set forth in claim 8 wherein said deflector member is connected to a torque motor having windings for receiving a control signal and is moved in response to said control signal such that the pressure differential in said outlet passages is substantially proportional to said control signal.

11. A valve connected to a source of fluid under pressure and to a device to be controlled comprising:
    an inlet conduit connected to said source and first and second outlet ports having connections to said device;
    a fluid receiver including first and second receiver passages positioned in close proximity to each other, said passages being connected to said first and second outlet ports;
    nozzle means directing a rounded control stream from said source to at least one of said receiver passages;
    a movable deflector member having an enclosed rounded contacting surface formed to intersect said control stream at an angle, said surface intersecting the surface of said member nearest said receiver ports at an acute angle and forming an edge therewith; and
    means moving said deflector member such that said tapered contacting edge intrudes into said stream just sufficiently to produce a small deflecting stream which deflects substantially the entire flow of said control stream at an angle with respect to its direction leaving said nozzle means such that a larger proportion thereof flows into the other of said passageways.

12. A valve as set forth in claim 11 wherein said nozzle means normally directs said control stream substantially into the first of said receiver passages and intrusion of said deflector member into said control stream causes a greater proportion of the flow of said control stream to be deflected into said second passageway.

13. A valve as set forth in claim 11 wherein said nozzle means normally directs a control stream such that a substantial flow enters each of said receiver passages to produce a desired pressure ratio in said controlled device, and control means are provided for moving said deflector member in proportion to an input condition to produce a response in said controlled device proportional to said input condition.